United States Patent
Geddes et al.

(10) Patent No.: US 7,900,245 B1
(45) Date of Patent: Mar. 1, 2011

(54) METHOD AND SYSTEM FOR NON-REPEATING USER IDENTIFICATION IN A COMMUNICATION SYSTEM

(75) Inventors: Martin Geddes, Overland Park, KS (US); Daniel S. Vacanti, Mission, KS (US); David J. Anderson, Seattle, WA (US); Todd M. Conley, Elkhorn, NE (US); Piyush Jethwa, Overland Park, KS (US); Tania Maza-Deblauwe, Kansas City, MO (US); Wone-Hoe Chan, Overland Park, KS (US); Ganga Madhavarapu, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1842 days.

(21) Appl. No.: 10/272,222

(22) Filed: Oct. 15, 2002

(51) Int. Cl.
*H04L 9/32* (2006.01)
*G06F 21/00* (2006.01)
*G06F 7/04* (2006.01)

(52) U.S. Cl. ............... 726/9; 726/20; 713/159; 713/172; 713/185

(58) Field of Classification Search .......... 713/172–185, 713/189, 159; 726/8, 10, 9, 20
See application file for complete search history.

(56) References Cited

U.S. PATENT DOCUMENTS

| | | | |
|---|---|---|---|
| 5,657,388 A * | 8/1997 | Weiss | 713/185 |
| 5,966,705 A | 10/1999 | Koneru et al. | |
| 6,199,052 B1 * | 3/2001 | Mitty et al. | 705/75 |
| 6,236,981 B1 * | 5/2001 | Hill | 705/67 |
| 6,360,254 B1 | 3/2002 | Linden et al. | |
| 6,385,729 B1 * | 5/2002 | DiGiorgio et al. | 726/9 |
| 6,434,535 B1 * | 8/2002 | Kupka et al. | 705/24 |
| 6,505,238 B1 * | 1/2003 | Tran | 709/208 |
| 6,678,731 B1 * | 1/2004 | Howard et al. | 709/225 |
| 6,687,745 B1 * | 2/2004 | Franco et al. | 709/219 |
| 6,898,711 B1 * | 5/2005 | Bauman et al. | 713/185 |
| 6,938,079 B1 * | 8/2005 | Anderson et al. | 709/222 |
| 6,961,857 B1 * | 11/2005 | Floryanzia | 713/168 |
| 6,993,652 B2 * | 1/2006 | Medvinsky | 713/155 |
| 2003/0001016 A1 * | 1/2003 | Fraier et al. | 235/462.03 |
| 2003/0005280 A1 * | 1/2003 | Bobde et al. | 713/150 |
| 2003/0028653 A1 * | 2/2003 | New et al. | 709/229 |
| 2003/0196084 A1 * | 10/2003 | Okereke et al. | 713/156 |
| 2003/0200465 A1 * | 10/2003 | Bhat et al. | 713/202 |
| 2003/0233554 A1 * | 12/2003 | Litai et al. | 713/182 |
| 2004/0054915 A1 * | 3/2004 | Jong et al. | 713/193 |

OTHER PUBLICATIONS

Zeroknowledge, "Anonymous Web Surfing and Anonymous Web Browsing Software," http://www.freedom.net/products/ websecure/index.html?partner_id=3930, printed from the World Wide Web on Sep. 3, 2002.
Webveil, "WebVeil's Anonymous Surfing Guide," http://webveil.com/matrix.html, printed from the World Wide Web on Sep. 3, 2002.
David L. Wasley, et al., "Shibboleth & Portals," Draft-Wasley-Shibboleth-portals-02, May 12, 2002.

(Continued)

*Primary Examiner* — Nasser G Moazzami
*Assistant Examiner* — Mohammad W Reza

(57) ABSTRACT

A method and system operative to preclude content providers from tracking users, while still allowing content providers to communicate to users. An intermediary, such as an access channel provider for instance, gives content providers non-repeating user-identification-tokens, each of which a content provider can use as a key to access an intermediary resource that facilitates a communication to the user, without revealing the user's identity to the content provider.

26 Claims, 4 Drawing Sheets

OTHER PUBLICATIONS

Russell Samuels and Ed Hawco, "Untraceable Nym Creation on the Freedom 2.0 Network™," Zero-Knowledge Systems Inc., Nov. 1, 2000.

Cheryl Beaver et al., "A Design for Anonymous, Authenticated Information Sharing," Proceedings of the 2001 IEEE, Workshop on Information Assurance and Security, pp. 161-168, Jun. 5-6, 2001.

Steven Carmody, "Shibboleth Overview and Requirements," http://middleware.internet2.edu/shibboleth/docs/draft-internet2-shibboleth-requirements-01.html, dated Feb. 20, 2001, printed from the World Wide Web.

Network Appliance, "Internet Content Adaptation Protocol (ICAP)," pp. 1-13, Jun. 30, 2001.

IBM, Intermediaries: an Approach to Manipulating Information Streams, http://www.research.ibm.com/journal/sj/384/barrett.html, IBM Systems Journal, vol. 38, No. 4, 1999.

First USENIX Workshop on Electronic Commerce, Jul. 1995, Payment Switches for Open Networks, http://www.usenix.org/publications/library/proceedings/ec95/gifford.html, printed from the World Wide Web on Apr. 15, 2002.

USENIX, "Payment Switches for Open Networks," Proceedings of the First USENIX Workshop on Electronic Commerce, New York, New York, Jul. 1995, http://www.usenix.org/publications/library/proceedings/ec95/full_papers/gifford.txt, printed from the World Wide Web on Apr. 15, 2002.

Redknee, "Mobile Multimedia Gateway," http://www.redkneww.com/products/rk_pro_net_mobilemultimediagateway.php, printed from the World Wide Web on Apr. 15, 2002.

"Open Pluggable Edge Services (OPES)," http://www.ietf-opes.org/oldindex.html, printed from the World Wide Web on Apr. 15, 2002.

IBM, "Web Intermediaries (WBI)," http://www.almaden.ibm.com/cs/wbi/index.html, printed from the World Wide Web on Apr. 30, 2002.

IBM, "Plugins," http://www.almaden.ibm.com/cs/wbi/Plugins.html, printed from the World Wide Web on Apr. 30, 2002.

IBM, "WebPlaces: Adding People to the Web," http://www.almaden.ibm.com/cs/wbi/papers/www8/wwwplaces-abstract.html, printed from the World Wide Web on Apr. 30, 2002.

IBM, "WebSphere Edge Server—Product Overview—IBM Software," http://www-3.ibm.com/software/webservers/edgeserver/, printed from the World Wide Web on Sep. 3, 2002.

Bridgewater Systems, "Content Access Controller," http://www.bridgewatersystems.com/products/content_controller/?BSCID=d8f8772, printed from the World Wide Web on Sep. 3, 2002.

Identifying Web Users in a Proxy Server, U.S. Appl. No. 09/466,104 (Applicants do not have a copy of the cited patent application).

Extracting Contents of a Document During Delivery, U.S. Appl. No. 09/512,974 (Applicants do not have a copy of the cited patent application).

Secure Network Proxying, U.S. Appl. No. 09/512,975 (Applicants do not have a copy of the cited patent application).

Expediting the Retrieval of External Components Referenced in a Document, U.S. Appl. No. 09/512,976 (Applicatns do not have a copy of the cited patent application).

Commercial Activity Performed in Conjunction with Document Retrieval, U.S. Appl. No. 09/512,977 (Applicants do not have a copy of the cited patent application).

Modifying Contents of a Document During Delivery, U.S. Appl. No. 09/513,217 (Applicants do not have a copy of the cited patent application).

A. Barbir et al., "An Architecture for Open Pluggable Edge Services (OPES)," Network Working Group, Internet-Draft, Aug. 2, 2002.

A. Barbir et al., "OPES Use Cases and Deployment Scenarios," Network Working Group, Internet-Draft, Aug. 5, 2002.

A. Beck et al., "Requirements for OPES Callout Protocols," Internet-Draft, Aug. 2, 2002.

A. Beck et al., "Example Services for Network Edge Proxies," Internet Draft, Nov. 21, 2000.

* cited by examiner

METHOD AND SYSTEM FOR NON-REPEATING USER IDENTIFICATION IN A COMMUNICATION SYSTEM

BACKGROUND

1. Field of the Invention

The present invention relates to network communications and, more particularly, to a method and system for securing user identity and privacy while facilitating communications between user and content providers.

2. Description of Related Art

Recent growth in the telecommunications industry has ushered in a new era of convenience and productivity. With the widespread availability of wireless and Internet communications, as well as the continued use of more conventional communication technology, users can now readily access information over communication networks from virtually any location and at virtually any time.

In typical practice, a user will operate a client station to communicate with a content server operated by a content provider. Through use of the client station, the user might send a request for information to the content server. And the content server might then responsively send the requested information to the client station, for presentation to the user.

The user's request to the content provider and the content provider's response to the user could travel over the same or different networks. Further, the request and response could occur within a single session between the user and content provider, or the request could occur within one session and the response could then occur within another session. And still further, the user could send a request from one client station and receive a response at another client station, and the content provider could receive a request at one server and send a response from another server. Other variations are possible as well.

In Internet communications, for example, a user could direct his or her client station to send a request for web content over a packet-switched network to a web server, and the web server could then send the web content over the network to the requesting client station. Conventionally, the client and server could communicate with each other according to the industry standard hypertext transfer protocol (HTTP). According to HTTP, for instance, the client could send an HTTP "GET" request that identifies the desired content. And the server could then send an HTTP "200 OK" response that defines the designated content by a set of markup language (e.g., HTML, WML, HDML, XHDML, cHTML or VXML). A browser running on the user's client station could then interpret the markup language and present the requested content to the user.

Alternatively, after receiving the user's HTTP GET request, the content provider could send the user an HTTP 200 OK response that simply acknowledges the user's request rather than providing the requested content. And at some later point, such as when the information becomes available, the server could then generate and send an e-mail message, phone call, short message service (SMS) message, or other sort of communication to the user, providing the user with the requested content.

A problem with existing communication arrangements, however, is that they allow content providers to easily track user activity. The reason for this is that user communications to content providers frequently identify the user, in order to facilitate response communications from the content providers to the user. For example, given the identity of a user, a content provider might query an information-database to obtain information about the user (such as the user's current location), and the content provider might then customize content based on the acquired information and send the customized content to the user. And as another example, given the identity of a user, the content provider might be able to initiate a communication, such as an e-mail message, phone call or SMS message to that user.

Unfortunately, each time a content provider receives such a communication from a given user, the content provider can easily log the fact that the user sent the communication. And each time the content provider sends content to the user in response to such a communication, the content provider can similarly log the fact that the content was sent to the user. Provided with this information, a content provider can then readily build user profiles and demographic databases, which many people consider to be an invasion of user privacy or otherwise undesirable.

SUMMARY

The present invention is directed to a method and system that can help to preclude content providers from tracking users, while still allowing content providers to establish and send communications to users. As a general matter, an exemplary embodiment of the invention involves having a communication-intermediary give content providers non-repeating user-identification-tokens, each of which a content provider can use as a key to access an intermediary resource that facilitates a communication to the user, without revealing the user's identity to the content provider.

In accordance with the exemplary embodiment, the intermediary embeds in each token a value indicative of the user, such as by encrypting the value into the token, so that the token does not reveal the value. That way, assuming the content provider cannot decrypt the token (or otherwise uncover the embedded value), the content provider will not be able to determine the identity of the user from just the token. However, in order to facilitate a communication to the user, the content provider can submit the token back to the intermediary as a key to access a user-specific resource. And upon receipt of the token, the intermediary could uncover the embedded value from the token so as to determine the user identity and, given the user identity, could then grant access to the user-specific resource.

Advantageously, the tokens that the intermediary provides to identify a given user are "non-repeating," in that each token for the user is different. Thus, for instance, on a first occasion that the intermediary sends a token to identify user A, the token might be "12345," and on another occasion that the intermediary sends a token to identify the same user A, the token might be "98765". The benefit of this arrangement is that, while the recipient content provider(s) could still submit the tokens to the intermediary as keys to access user-specific resources so as to facilitate communications to user A, the content provider(s) would be unaware that, in both instances, user A was the user. So the content provider would be unable to correlate the tokens with each other. And thus, the tokens, in and of themselves, would not enable the content provider(s) to track user A's communication activity.

In an exemplary embodiment, the value indicative of the user could be a user ID (e.g., user account identifier), such as a username, network access identifier, SIP address, mobile identification number or the like. Or as an added level of precaution, the intermediary could secretly map the user ID (or like value) to some other value and then use that other value as the value indicative of the user. In any event, the intermediary could then establish each different user-token by encrypting a combination of at least (i) the value indicative of the user and (ii) a value that is different for each token, such as a random number (e.g., GUID/UUID) or simply a timestamp, for example.

Further, in the exemplary embodiment, the user-specific resource that a content provider could access by submitting a user-token as user identification could also take various forms. As an example, the resource could be information about the user (e.g., the user's current location, or the user's preferences), which the content provider could use as a basis to customize a communication to the user. And as another example, it could be a communication link to the user. For instance, if the intermediary is an access channel provider, such as an Internet service provider or the like, the intermediary might govern an access channel to each of its subscribers, and the intermediary could allow a communication to pass through the channel to a given subscriber if the intermediary receives a user-token that represents that subscriber.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary Communication System

Figure 1:
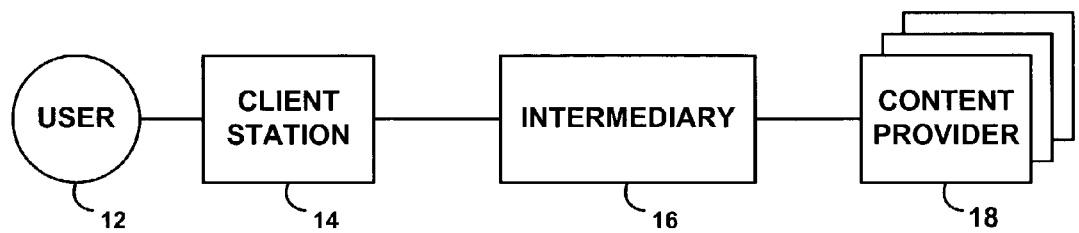
FIG. 1 is a simplified block diagram of a communication system in which the exemplary embodiment can be implemented.

Referring to the drawings, FIG. 1 is a simplified block diagram of an exemplary communication system in which an embodiment of the present invention can be implemented. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, many of the elements described herein are functional entities that may be implemented as discrete or distributed components or in conjunction with other components, and in any suitable combination and location.

Additionally, various functions described herein as being performed by one or more entities may be carried out by hardware, firmware and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

As shown in FIG. 1, the exemplary communication system includes a user 12, a client station 14, an intermediary 16, and at least one content provider (shown by way of example as a plurality of content providers) 18. As a general matter, user 12 operates client station 14 to communicate with the content providers 18 over a communication path that includes intermediary 16. (Examples of such communication paths are discussed in U.S. patent application Ser. No. 10/189,941, filed Jul. 3, 2002, the entirety of which is incorporated herein by reference.) Thus, intermediary 16 sits within the path between user 12 and the content providers 18 and can therefore intermediate in communications that pass over that path. Alternatively or additionally, the intermediary 16 could sit elsewhere and could still be involved in the communication process in order to achieve the benefits described herein.

In the exemplary embodiment, intermediary 16 could be an access channel provider that supplies user 12 with a communication link or passageway through which the user 12 could communicate with content providers 18. As such, the intermediary could take various forms. For example, if the user 12 communicates over the Internet with the content providers 18, the intermediary 16 might be an Internet Service Provider, such as a cable modem service provider, a DSL service provider, a dial-up service provider and/or a 3G cellular service provider. And as another example, if the user communicates over the PSTN with the content providers 18, the intermediary 16 might be a PSTN service provider, such as a landline or wireless telephone company for instance. And as still another example, if the user communicates over a LAN or WLAN with the content providers 18, the intermediary might be simply an access point or LAN/WLAN server.

Figure 2:
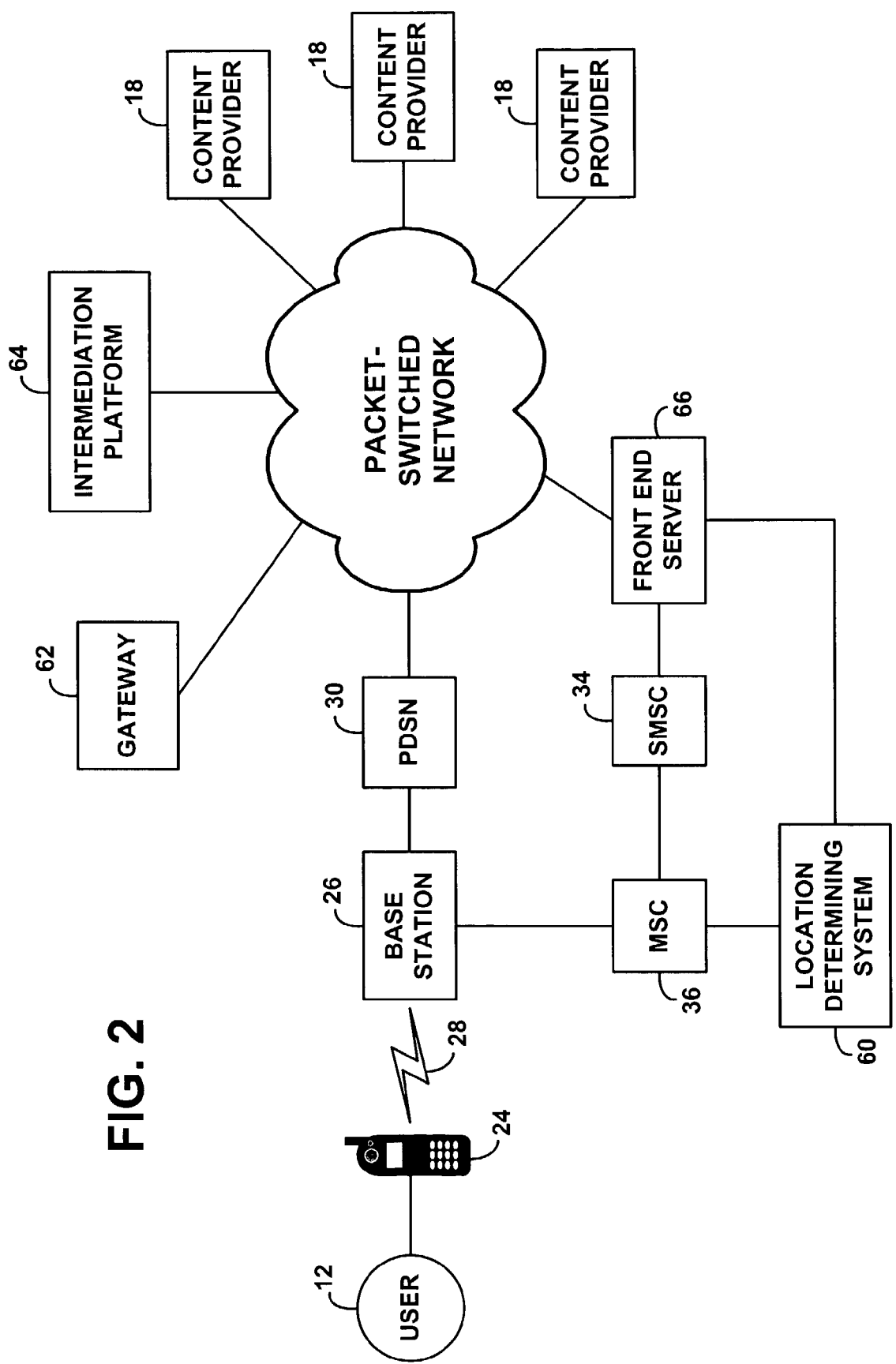
FIG. 2 is a simplified block diagram depicting a wireless carrier system that could function as an intermediary in accordance with the exemplary embodiment.

Referring next to FIG. 2, for instance, the intermediary could be a cellular wireless carrier that provides users with wireless Internet connectivity and that provides users with the ability to wirelessly receive SMS messages and other communications. In this arrangement, the client station may be a wireless device 24 (such as a cellular/PCS telephone or a computing device equipped with a wireless communication module), and the wireless carrier may operate a base station 26 that communicates with the wireless device 24 over a radio frequency (RF) air interface 28.

To enable wireless device 24 to communicate over the Internet, base station 26 may in turn be coupled with a packet data serving node (PDSN) 30 that provides connectivity to the Internet. Thus, in operation, wireless device 24 could establish a data link (e.g., point-to-point protocol link) with PDSN 30 and could then acquire an IP address. Assuming that the content servers operated by content providers 18 also have IP addresses, the wireless device 24 and content providers 18 could then exchange packet data communications, via the wireless carrier. In this regard, the wireless device could be equipped with a web browser, and the content providers could operate web servers, so the wireless device and content providers could exchange HTTP messages via the wireless carrier.

Further, to enable the wireless device 24 to receive SMS messages, the wireless carrier could include an SMS controller (SMSC) 34. According to well known industry standards, an SMSC functions to store and forward SMS messages to SMS-capable entities. Thus, in operation, a content provider 18 might give the wireless carrier a text message to be delivered as an SMS message to the user 12 of wireless device 24. And the wireless carrier would then transmit the message in an SMS delivery request to the SMSC 34. In turn, when the wireless device 24 is available to receive the message, the SMSC 34 could transmit it to a mobile switching center (MSC) 36, for delivery via base station 26 and air interface 28 to the wireless device 24. An SMS client application running on the wireless device 24 could then receive and present the text message to the user 12.

Alternatively, rather than being an access channel provider, intermediary 16 of FIG. 1 could be some other entity that sits in the communication path between client station 14 and the content providers 18 or elsewhere. For example, the intermediary 16 could be a proxy server (not shown) that functions to forward or bridge communications between the client station 14 and the content providers 18. As such, the client station 14 might gain network access through an access channel provider and then send communications over the network to the proxy server, for transmission in turn to the content servers 18. Similarly, communications from the content servers 18 to the client station 14 might then pass through the same proxy server.

Figure 3:
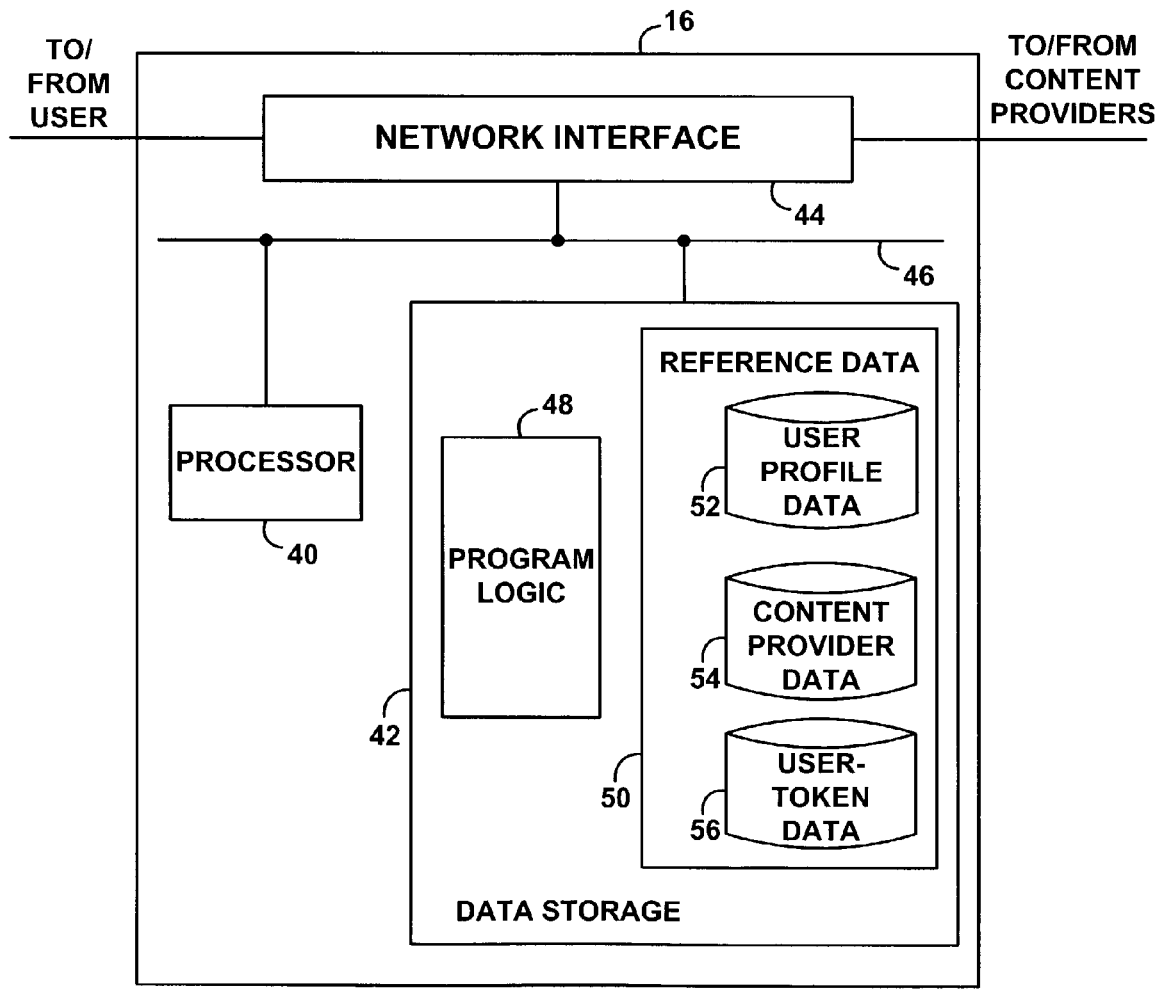
FIG. 3 is a simplified block diagram showing functional components of an intermediary in accordance with the exemplary embodiment.

Turning next to FIG. 3, a simplified block diagram of an exemplary intermediary 16 is shown, depicting some of the functional components that could be included in, or maintained or applied by, an intermediary in accordance with the exemplary embodiment. As shown in FIG. 3, exemplary intermediary 16 includes a processor (i.e., one or more processors) 40, data storage 42, and a network interface (i.e., one or more network interfaces) 44, which may be coupled together by a system bus, network or other link 46.

In the exemplary embodiment, data storage 42 (e.g., volatile or nonvolatile memory, disk storage and/or other such mechanisms) includes program logic 48 and reference data 50. The program logic 48 may comprise a set of machine language instructions executable by processor 40 to carry out various functions described herein. For example, the program logic may be executable during each of a plurality of communications from user 12 to the at least one content provider 18, to detect the communication, and to responsively generate and send to the content provider a non-repeating user-token representative of the user. And the program logic may further be executable upon receipt of such a user-token from a content provider, to identify the user based on the token, and to grant or deny access to a user-specific resource (such as information about the user, or a link to the user) that facilitates the communication to the user.

The reference data 50, in turn, may include various data that the processor writes and/or reads as it executes the program logic. For instance, the reference data 50 may include (i) user profile data 52, (ii) content provider data 54 and (iii) user-token data 56. Profile data 52 may include user identification information, such as an indication of each user's User ID, user service profiles (e.g., services to which the user subscribes), as well as user preference information, such as an indication of each user's favorite sports, music and foods, for example. As another example, for wireless communications or if otherwise appropriate, profile data 52 might include indications of user location, such as latitude/longitude or street address for instance.

Content provider data 54 might then include records of various content providers to which the intermediary 16 may provide user-tokens. As such, each content provider might own or operate one or more content servers, and, for Internet communications, each content server might host one or more Internet domains. Thus, in that scenario, the content provider data 54 might correlate each content provider with its respective domains and/or its respective content servers. Further, content provider data 54 might include a list that indicates destination content providers, hosts or domains as to which the intermediary should apply some sort of intermediation function, such as sending user-tokens for instance.

User-token data 56 may then comprise a record of user-token information. For instance, the user-token data might include a record of encryption/decryption keys to use for establishing user-tokens and for uncovering user identities from the tokens. And the user-token data might include mappings between User IDs and static-random values to be embedded within user tokens in accordance with the exemplary embodiment.

Network interface 44, in turn, may function to receive and send communications between the user 12 and the at least one content provider 18. Thus, for example, if the user 12 and content provider 18 communicate with HTTP over TCP/IP, the network interface might be an Ethernet network interface card suitable for receiving and sending HTTP over TCP/IP communications. Alternatively, network interface 44 might function to receive an indication that a communication is occurring between the user 12 and the at least one content provider 18, rather than (or in addition to) receiving and sending the actual communication.

In the exemplary embodiment, the intermediary 16 maintains or otherwise has access to one or more user-specific resources to which the intermediary might grant access in order to facilitate communications to users. A user-specific resource for a given user (individually or among a group of users) is thus something that can facilitate a communication from a content provider to the given user. As such, the user-specific resource could take various forms.

For example, a user-specific resource could take the form of information that can be used as a basis to customize, tailor or otherwise facilitate establishment of a communication to send to the user. For instance, the user profile data 52 noted above could be a user-specific resource, since a content provider could take the user's preferences or current location into account when establishing a communication to send to the user.

And as another example, a user-specific resource could take the form of a system that can determine and/or report information regarding the user, again since that information could be used as a basis to facilitate establishment of a communication to send to the user. The wireless carrier arrangement shown in FIG. 2, for instance, might include a location-determining system 60 that can determine and report the location of wireless device 24. Provided with that location information, a content provider could then tailor a communication based on the user's location (e.g., to indicate the weather in the user's area, or to indicate the names of nearby restaurants, etc.)

And as another example, a user-specific resource could take the form of an access channel or other communication link to the user, since such a communication link facilitate the act of sending communications to the user. FIG. 2 depicts at least two examples of this. First, air interface 28 in FIG. 2 is a type of user-specific resource, since any communications sent wirelessly to wireless device 24 would have to pass through that air interface. And second, the SMS messaging system shown in FIG. 2 is another type of user-specific resource, since any SMS messages sent to wireless device 24 would have to pass through that system.

In the exemplary embodiment, intermediary 16 may be arranged to receive from a content provider 18 a request for access to a user-specific resource, in order to facilitate a communication to user 12. For this purpose, network interface 44 could function to receive the request and pass the request onto processor 40 for handling. And to the extent the intermediary would then respond to the content provider's request (e.g., providing requested information, and/or acknowledging the request), network interface 44 could also receive a response from processor 40 and send that response on to the content provider.

The functional components of an exemplary intermediary 16, as shown in FIG. 3, could reside in one location or could be distributed. For instance, in the wireless carrier arrangement shown in FIG. 2, the functional components could reside in, or be distributed or replicated among, a gateway 62, a dedicated intermediation platform 64, and/or a front end server 66, each of which might sit on the IP network. In this regard, for instance, data storage 42 could be maintained at a central location accessible by each of these entities.

Thus, in example operation, when a user sends an HTTP request via the wireless carrier to a content provider 18, the wireless carrier might pass the request to the gateway 62, which might apply the list described above to determine that the destination content provider (e.g., domain) is one to which the carrier should apply an intermediation function. In turn, the gateway 62 may then send the communication to the intermediation platform 64. The intermediation platform 64 may then generate a non-repeating user-token and send the token (in the communication or separately) to the destination content provider 18.

In turn, front end server 66 might receive from the content provider 18 the user-token together with a request to access a user-specific resource so as to facilitate a communication to the user 12. And front end server 66 might then identify the user from the user-token and either grant or deny the requested access. For instance, if the request is to send an SMS message to the user represented by the user-token, the front end server 66 might grant the requested access and then send the message via IP network to the SMSC 34 for transmission in turn to wireless device 24. Or if the request is to obtain the user's location, front end server might query the location determining system 60 to determine the user's location and then report the location in response to the requesting content provider.

As noted above, a user could operate multiple client stations. Thus, referring to FIG. 1 for instance, user 12 could operate one client station 14 to send a communication to a content provider 18, and the content provider 18 could, in response or otherwise, send a communication to the user at another client station 14. As a specific example of this, user 12 could place a phone call from a landline telephone to intermediary 16, to sign up for an SMS-coupon service offered by a given content provider 18, and intermediary 16 could then pass the request along to the content provider. In turn, the content provider could send SMS-based coupons to user 12 at wireless device 24, through intermediary 16.

Similarly, as noted above, a content provider 18 could operate multiple content servers. Thus, a content provider 18 could receive a communication from user 12 at one content server. And the content provider could send a communication to the user, in response to the user's communication or otherwise, from another content server.

2. Example Operation

Figure 4:
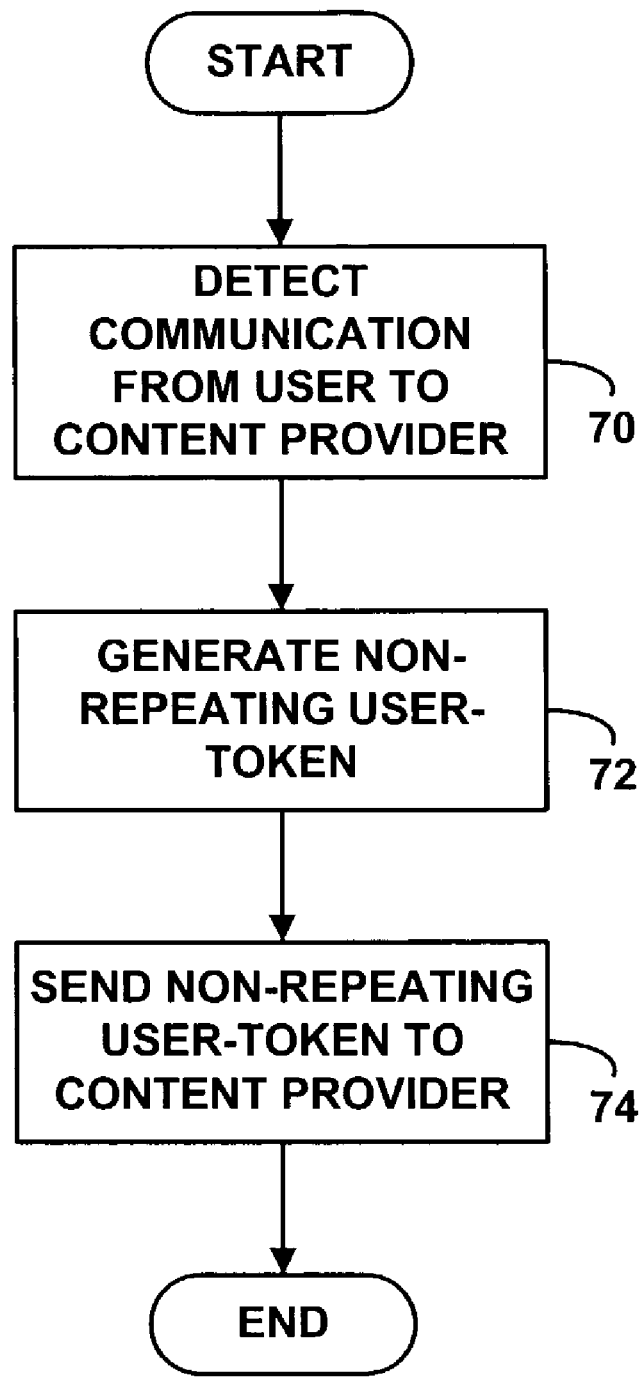
FIG. 4 is a flow chart depicting functions carried out by an intermediary to provide non-repeating user identification tokens to content providers in accordance with the exemplary embodiment.
Figure 5:
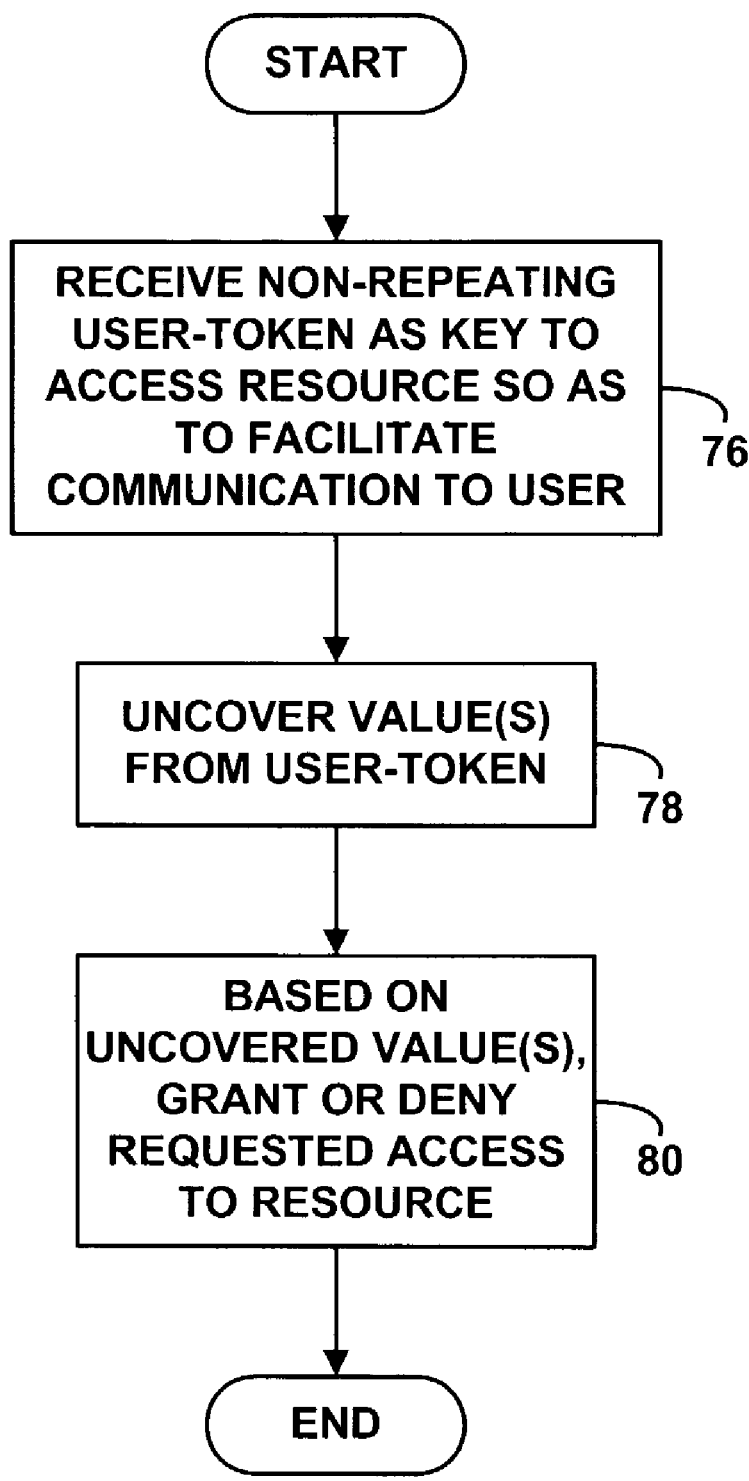
FIG. 5 is a flow chart depicting functions carried out by an intermediary to redeem non-repeating user identification tokens, so as to facilitate communications to a user in accordance with the exemplary embodiment.

As a general matter, intermediary 16 could be arranged to carry out at least two principal functions in accordance with the exemplary embodiment. First, the intermediary sends non-repeating user-tokens to content providers. And second, the intermediary receives non-repeating user-tokens from content providers as keys to access user-specific resources so as to facilitate communications to users. FIGS. 4 and 5 are flow charts, depicting these two functions.

FIG. 4 first depicts process steps that may be carried out by intermediary 16 to send non-repeating user-tokens to content providers. Preferably, this process occurs during each of a plurality of communications from the user 12 to the at least one content provider 18 (i.e., during each of a plurality of communications to a single one of the content providers 18, and/or during each of a plurality of communications to various ones of the content providers 18)

As shown in FIG. 4, at block 70, the intermediary first detects a communication from the user 12 to a content provider 18. The process of detecting such a communication could take various forms, depending on the form and placement of the intermediary. For example, the intermediary could detect the communication by being directly involved in the communication, such as by functioning as a proxy or gateway through which the communication passes. And as another example, the intermediary could detect the communication by being told that the communication is occurring. (E.g., a network entity involved with the communication could signal to the intermediary to indicate that the communication is occurring.)

At block 72, the intermediary then generates a non-repeating user-token (if not already generated). The token is considered to be non-repeating in that the intermediary preferably does not generate the same user token twice (within a defined period of time, or over a given number of tokens, for instance) to represent a given user 12. Thus, the user-token that the intermediary generates during a given communication from the user 12 to the at least one content provider 18 is preferably different than the user-token that the intermediary generates during another communication from the user 12 to the at least one content provider 18. That way, the user-tokens will not appear to the at least one content provider 18 to identify a common user.

In accordance with the exemplary embodiment, each user-token contains an embedded value indicative of the user but does not reveal the embedded value. For example, the embedded value may be the user's User ID, or the embedded value may be a replacement value to which the intermediary maps the user's User ID. In the latter case, the intermediary might maintain in data storage 42 a mapping table that correlates each user's ID with a randomly generated replacement value or other replacement value. Using a replacement value instead of the User ID provides an added layer of security, since, if someone were to decrypt a user-token, they would at best uncover the replacement value rather than the User ID.

In order to make the user-token different from other user-tokens that the intermediary generates to represent the user 12, the intermediary can derive the user-token from a combination of values (e.g., a defined concatenation of values) including (i) the value indicative of the user and (ii) a value that is different for each user-token. In this regard, the value that is different for each user-token could be a randomly generated value, such as a GUID/UUID value generated through procedures well known to those skilled in the art. Or it could be simply a timestamp indicating when the token is generated or indicating some other event.

More particularly, in the exemplary embodiment, the intermediary preferably generates a the user-token by encrypting a combination of values including at least (i) the value indicative of the user and (ii) the value that is different for each user-token. For instance, the user-token could result from encrypting, or applying some other defined function to, a combination of (i) the User ID, (ii) timestamp, (iii) a sequence number, and (iv) a random number.

In this regard, the encryption process can take any desired form. By way of example, the encryption process could be the well known Triple-DES algorithm or some variation of that algorithm. Preferably the encryption process results in an encrypted value that can be decrypted through an inverse function, given a secret key. And the intermediary preferably maintains the secret key in confidence. Further, the encryption process preferably involves sufficiently combining the value indicative of the user with the value that is different for each token, so that any two tokens generated to identify a common user would preferably not appear to relate to a common user.

In the exemplary embodiment, the intermediary may also embed within the user token one or more values that could allow the intermediary to limit redemption of the token in some way. For example, the timestamp noted above could serve this function, since the intermediary could then later read the timestamp from the token in order to determine whether the token has expired. And as another example, the intermediary could include in the token an indication of the content provider (or host or domain) to which the intermediary will send the token, so the intermediary could later determine whether that content provider (or host or domain) is the one who seeks to redeem the token. Other examples are possible as well.

Continuing with reference to FIG. 4, at block 74, the intermediary then sends the non-repeating user-token to the destination content provider 18. The intermediary could do this in various ways. For example, if the communication passes through the intermediary (whether transparently or regenerated in the same or different form by the intermediary), the intermediary could insert the user-token into the communication. In an HTTP request message, for instance, the intermediary could insert the user-token in the User ID field of the request-URI. And as another example, the intermediary could send the user-token to the content provider in some other agreed and expected message format, such as in an HTTP message, a SIP message, or an e-mail message, in parallel with the communication to the content provider, for instance.

Note that in an alternative embodiment, the intermediary could generate and send a non-repeating user-token to a content provider at a time other than during a communication from the user to the content provider. For instance, the intermediary could sell (or otherwise provide) to a given content provider a set of user-tokens that each enable the content provider to send an SMS message to a respective user represented by the token. Advantageously, this could allow the content provider to send the SMS messages when desired without knowing the identity of the SMS message recipient(s).

FIG. 5 next depicts process steps that may be carried out by intermediary 16 to facilitate each of a plurality of communications from the at least one content provider 18 to the user 12 (i.e., for each of a plurality of communications coming from a single one of the content servers 18 and/or from each of a plurality of the content servers 18.)

As shown in FIG. 5, at block 76, the intermediary 16 receives one of the non-repeating user-tokens from a content provider as a key to access a user-specific resource, so as to facilitate a communication from the content provider to the user. This function can take various forms as well. For example, if the user-specific resource that the content provider is attempting to access is information or an information-resource (e.g., a location determination system), the intermediary could receive the user-token from the content provider 18 in or with a message that designates the information desired. And as another example, if the user-specific resource is a communication link through which to send a communication to the user, the intermediary could receive the user-token from the content provider 18 together with the communication to deliver to the user via that link. In the arrangement of FIG. 2, for instance, the wireless carrier might receive a request at gateway 62, intermediation platform 64 or front end server 66.

In turn, at block 78, the intermediary uncovers from the user-token one or more underlying values. For example, if the user-token resulted from encrypting a defined concatenation of (i) a User ID and (ii) a random value, then the intermediary could decrypt the token and uncover the User ID. And as another example, if the user-token resulted from encrypting a defined concatenation of values including a timestamp and/or a content server (or host or domain) identifier, then the intermediary could similarly decrypt the token and uncover the timestamp and/or content server (or host or domain) identifier.

At block 80, the intermediary may then use the one or more recovered values as a basis to determine whether to grant or deny access to the user-specific resource. For example, if the content provider is seeking to send an SMS message to the user, the intermediary may uncover the user's User ID from the user-token and may then refer to user profile data 52 to determine whether the user is authorized to receive SMS messages and/or whether the user has authorized the content provider to send an SMS message. If the user is authorized to receive SMS messages, then the intermediary may allow the SMS message to pass through to the user; otherwise, the intermediary may deny access.

And as another example, if a request came from a particular content provider, the intermediary could uncover a request-domain identifier from the user-token and determine, by reference to content provider data 54, whether the indicated domain is within the auspices of the requesting content provider. If not, the intermediary could conclude that a third party content provider somehow acquired the token and is illegitimately seeking to redeem it, so the intermediary could deny access to the user-specific resource. Otherwise, the intermediary could grant access.

Still further, as another example, the intermediary could uncover a timestamp from the user-token and could compare the timestamp to a current time. If more than a threshold amount of time has passed since the time indicated by the timestamp, the intermediary could then conclude that the token has expired and could deny access to the user-specific resource. (In this regard, the threshold expiration time could vary per user or based on other factors.) And if not, the intermediary could grant access. Other examples are possible as well.

3. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. In a communication system comprising at least one content provider and a user, a method comprising:
conveying to the at least one content provider from an intermediary a plurality of user-identification tokens during a corresponding plurality of communications between the user and the at least one content provider, wherein, each user-identification token contains an embedded value indicative of the user but does not reveal the embedded value to the at least one content provider, wherein, each user-identification token is different, so that the plurality of user-identification tokens do not appear to the at least one content provider to identify a common user, and wherein, each user-identification token is usable by the at least one content provider as a key to access a user-specific resource so as to facilitate a respective communication from the at least one content provider to the user.

2. In a communication system in which an intermediary maintains a user-specific resource that facilitates communications between at least one content provider and a user, a method comprising:

during each of a plurality of communications from the user to the at least one content provider, the intermediary sending to the at least one content provider a respective user-token that contains an embedded value indicative of the user but that does not reveal the value to the at least one content provider, wherein each respective user token is different so that multiple respective user-tokens do not appear to the at least one content provider to indicate a common user; and to facilitate each of a plurality of communications from the at least one content provider to the user, the intermediary thereafter receiving from the at least one content provider one of the respective user-tokens as a key to access the user-specific resource.

3. The method of claim 2, wherein sending a respective user-token to the at least one content provider during a given communication from the user to the at least one content provider comprises:

inserting the respective user-token into the given communication from the user to the at least one content provider.

4. The method of claim 2, wherein at least one of the communications from the at least one content provider to the user is responsive to at least one of the communications from the user to the at least one content provider.

5. The method of claim 4, wherein the at least one communication from the user to the at least one content provider comprises an HTTP request message, and the at least one communication from the at least one content provider to the user comprises an HTTP response message.

6. The method of claim 2, wherein the user-specific resource comprises information about the user, and wherein the information is usable by the content provider to customize at least one of the communications from the at least one content provider to the user.

7. The method of claim 6, wherein the information comprises a location of the user, and wherein the information is usable by the content provider as a basis to provide location-based information to the user in at least one of the communications from the at least one content provider to the user.

8. The method of claim 2, wherein the user-specific resource comprises a communication link to the user, and wherein the intermediary carries at least one of the communications from the at least one content provider to the user via the communication link.

9. The method of claim 2, wherein each respective user-token is derived from a combination of values including (i) the value indicative of the user and (ii) a value that is different for each respective user-token.

10. The method of claim 9, wherein the value that is different for each respective user-token comprises a randomly generated value.

11. The method of claim 9, wherein the user has a User ID, and wherein the value indicative of the user comprises the User ID.

12. The method of claim 9, further comprising:

during each communication from the user to the at least one content provider, the intermediary applying a predetermined function to the combination of values, to produce the respective user-token that the intermediary sends to the at least one content provider.

13. The method of claim 12, further comprising:

after receiving from the at least one content provider a respective user-token as a key to access the user-specific resource, the intermediary applying an inverse of the predetermined function so as to uncover from the received user-token the value indicative of the user; and the intermediary then using the value indicative of the user to provide access to the user-specific resource.

14. The method of claim 12, wherein the value that is different for each respective user-token comprises a timestamp indicative of a time when the intermediary generates the respective user-token.

15. The method of claim 14, further comprising:

after receiving from the at least one content provider a respective user-token as a key to access the user-specific resource, the intermediary applying an inverse of the predetermined function so as to uncover from the received user-token (i) the value indicative of the user and (ii) the timestamp; and the intermediary then using the timestamp as a basis to determine whether to provide access to the user-specific resource.

16. The method of claim 15, wherein using the timestamp as a basis to determine whether to provide access to the user-specific resource comprises:

denying access to the user-specific resource, in response to a determination that a predefined time period has passed from the time indicated by the timestamp.

17. The method of claim 9, wherein the user has a User ID, and wherein the method further comprises, during each communication from the user to the at least one content provider:

the intermediary mapping the User ID to the value indicative of the user; and the intermediary applying a predetermined function to the combination of values, to produce the respective user-token that the intermediary sends to the at least one content provider.

18. The method of claim 2, wherein a given one of the communications from the user to the at least one content provider is a communication from the user to a given content provider, and wherein the respective user-token that the intermediary sends to the at least one content provider during the given communication is derived as a functional combination of at least (i) a value indicative of the user and (ii) a value indicative of the given content provider.

19. The method of claim 18, wherein receiving from the at least one content provider one of the respective user-tokens as a key to access the user-specific resource comprises receiving from a particular content server the respective user-token that the intermediary sent to the at least one content provider during the given communication from the user to the given content provider, and wherein the method further comprises:

the intermediary uncovering from the received token the value indicative of the given content provider;

the intermediary granting access to the user-specific resource if the particular content server is the given content server; and the intermediary denying access to the user-specific resource if the particular content server is not the given content server.

20. The method of claim 18, wherein the value indicative of the given content provider comprises a network domain hosted by the content provider.

21. The method of claim 2, wherein the intermediary is a wireless carrier that provides a wireless access link for the user.

22. In a communication system in which an access provider provides a communication link through which a user can communicate with one or more content providers over a network, a method for preventing tracking of the user by said content providers during repeated communications between said user and said one or more content providers, the method comprising the steps of:

(a) in a first communication between said user and said one or more content providers, sending a first token from said access provider to said one or more content providers, said first token being used as a key to facilitate the first communication, and said first token containing an embedded value indicative of said user but said first token not revealing said value to said one or more content providers; and (b) in a second communication between said user and said one or more content providers, sending a second token from said access provider to said one or more content providers, said second token being used as a key to facilitate the second communication, and said second token also containing said embedded value indicative of said user but said second token also not revealing said value to said one or more content providers, wherein said second token is different from said first token.

23. In a communication system comprising at least one content provider and a user, an intermediation system comprising:

a processor;
data storage; and
machine language instructions stored in the data storage and executable by the processor to generate a plurality of user-identification tokens and to send the plurality of user-identification tokens to the at least one content provider, wherein, each user-identification token contains an embedded value indicative of the user but does not reveal the embedded value to the at least one content provider, wherein, each user-identification token is different, so that the plurality of user-identification tokens do not appear to the at least one content provider to identify a common user, and wherein, each user-identification token is usable by the at least one content provider as a key to access a user-specific resource so as to facilitate a respective communication from the at least one content provider to the user.

24. An intermediation system for passing communications between at least one content provider and a user, the intermediation system comprising:

a processor;
data storage;
machine language instructions stored in the data storage and executable by the processor, during each of a plurality of communications from the user to the at least one content provider, to send to the at least one content provider a respective user-token that contains an embedded value indicative of the user but that does not reveal the value to the at least one content provider, wherein each respective user-token is (i) used by the at least one content provider as a key to access a user-specific resource so as to facilitate a respective communication from the at least one content provider to the user, and (ii) different, so that multiple respective user-tokens do not appear to the at least one content provider to indicate a common user.

25. The intermediation system of claim 24, wherein the machine language instructions are executable to generate each respective user-token based on a random number.

26. In a communication system in which an access provider provides a communication link through which a user can communicate with one or more content providers over a network, a system for preventing tracking of the user by said content providers during repeated communications between said user and said one or more content providers, the improvement comprising:

a processor;
data storage; and
machine language instructions stored in the data storage and executable by the processor to carry out functions including:

(a) in a first communication between said user and said one or more content providers, sending a first token from said access provider to said one or more content providers, said first token being used as a key to facilitate the first communication, and said first token containing an embedded value indicative of said user but said first token not revealing said value to said one or more content providers; and (b) in a second communication between said user and said one or more content providers, sending a second token from said access provider to said one or more content providers, said second token being used as a key to facilitate the second communication, and said second token also containing said embedded value indicative of said user but said second token also not revealing said value to said one or more content providers, wherein said second token is different from said first token.

* * * * *